US010308997B2

(12) United States Patent
Stettner et al.

(10) Patent No.: US 10,308,997 B2
(45) Date of Patent: Jun. 4, 2019

(54) METHOD FOR PRODUCING ELEMENTAL RHODIUM

(71) Applicant: Heraeus Deutschland GmbH & Co. KG, Hanau (DE)

(72) Inventors: Martin Stettner, Altenstadt (DE); Vasco Thiel, Alzenau (DE); Stefanie F. Alameda, Biebergemund (DE); Steffen Voβ, Limeshain (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 81 days.

(21) Appl. No.: 15/555,238

(22) PCT Filed: Feb. 1, 2016

(86) PCT No.: PCT/EP2016/052045
§ 371 (c)(1),
(2) Date: Sep. 1, 2017

(87) PCT Pub. No.: WO2016/139020
PCT Pub. Date: Sep. 9, 2016

(65) Prior Publication Data
US 2018/0051358 A1 Feb. 22, 2018

(30) Foreign Application Priority Data

Mar. 5, 2015 (EP) .................... 15157697

(51) Int. Cl.
*C22B 3/44* (2006.01)
*C22B 5/00* (2006.01)
*C22B 7/00* (2006.01)
*C22B 11/00* (2006.01)
*C22B 3/00* (2006.01)

(52) U.S. Cl.
CPC ............... *C22B 11/04* (2013.01); *C22B 3/44* (2013.01); *C22B 5/00* (2013.01); *C22B 7/006* (2013.01); *C22B 11/00* (2013.01)

(58) Field of Classification Search
CPC .. C22B 3/44; C22B 11/04; C22B 4/00; C22B 11/06; C22B 11/00; C22B 5/00; C22B 7/006
See application file for complete search history.

(56) References Cited

U.S. PATENT DOCUMENTS

| 5,165,901 A * | 11/1992 | Crozier | C07C 211/65 |
| | | | 423/213.5 |
| 7,935,173 B1 | 5/2011 | Thomas et al. | |
| 2008/0236337 A1* | 10/2008 | Usui | C22B 3/44 |
| | | | 75/392 |
| 2016/0362804 A1* | 12/2016 | Chen | C22B 3/065 |

FOREIGN PATENT DOCUMENTS

| EP | 0363314 A1 | 4/1990 |
| GB | 2247888 A | 3/1992 |
| JP | 2009242812 A | 10/2009 |
| PL | 161738 B1 * | 7/1993 |

OTHER PUBLICATIONS

Kovalev I.A., "Dynamic sorption preconcentration of platinum metals," Department of Chemistry, M.V. Lomonosov Moscow State University, 119899 Moscow, Russian Foundation, Nov. 22, 1994, pp. 111-112.

Julsing H.G., "The use of sodium formate for the recovery of precious metals from acidic base metal effluents," Journal of Chemical Technology and Biotechnology, 76:349-354 (2001), pp. 349-354.

* cited by examiner

*Primary Examiner* — Tima M. McGuthry-Banks
(74) *Attorney, Agent, or Firm* — Blank Rome LLP

(57) ABSTRACT

Method for producing elemental rhodium, comprising the steps of:
(1) providing an aqueous suspension of diethylene triammonium hexahalogenorhodate adjusted with hydrohalic acid to a pH value of −1 to +2;
(2) adding a sufficient quantity of reducing agent for complete conversion of the diethylene triammonium hexahalogenorhodate to the suspension provided in step (1) and allowing the reaction to proceed until the formation of elemental rhodium is completed; and
(3) separating the elemental rhodium formed in step (2) from the hydrohalic aqueous composition formed in step (2);
whereby halogen is bromine and/or chlorine.

18 Claims, No Drawings

METHOD FOR PRODUCING ELEMENTAL RHODIUM

This application is a national stage of International Patent Application No. PCT/EP2016/052045, filed Feb. 1, 2016, which claims the benefit of European Patent Application 15157697.2, filed Mar. 5, 2015, each of which is hereby incorporated by reference in its entirety.

The present invention relates to a method for producing elemental rhodium from diethylene triammonium hexahalogenorhodate.

It is known to separate rhodium or $Rh^{3+}$ from other precious metals in the process of precious metals refining as a poorly soluble salt of aliphatic polyamine and trihydrogen hexahalogenorhodic acid. A known representative of said salts is the complex salt of diethylene triamine (DETA) and trihydrogen hexachlororhodic acid, i.e. the triethylene triammonium hexachlororhodate represented by formula, $H_3(DETA)RhCl_6$ or $(H_3NC_2H_4NH_2C_2H_4NH_3)(RhCl_6)$. It is also known to boil said salts of aliphatic polyamine and trihydrogen hexachlororhodic acid in aqua regia for further processing. In this process, the organic components are decomposed through oxidation and ultimately an acidic aqueous solution of $H_3RhCl_6$ is formed that can be subjected to further refining. According to another known alternative, the salts of aliphatic polyamine and trihydrogen hexahalogenorhodic acid are calcined in an oxygen-containing atmosphere and the rhodium-containing oxidic residue is subjected to further refining.

The present invention consists of a method for producing elemental rhodium, comprising the steps of:
(1) providing an aqueous suspension of diethylene triammonium hexahalogenorhodate adjusted with hydrohalic acid to a pH value of −1 to +2;
(2) adding a sufficient quantity of reducing agent for complete conversion of the diethylene triammonium hexahalogenorhodate to the suspension provided in step (1) and allowing the reaction to proceed until the formation of elemental rhodium is completed; and
(3) separating the elemental rhodium formed in step (2) from the hydrohalic aqueous composition formed in step (2);
whereby halogen shall be understood to be bromine and/or chlorine, preferably chlorine.

The terms and/or abbreviations, "halogen" or "hal", used in the description and in the claims represent bromine and/or chlorine, preferably chlorine.

The terms and/or abbreviations, "hydrohalic acid" or "hydrohalic", used in the description and in the claims represent hydrobromic acid and/or hydrochloric acid, preferably hydrochloric acid, and/or hydrobromic and/or hydrochloric, preferably hydrochloric.

An aqueous suspension of diethylene triammonium hexahalogenorhodate, adjusted with hydrohalic acid to a pH in the range of −1 to +2, preferably of −0.5 to +0.5, is provided in step (1) of the method according to the invention. The determination of the pH value is not associated with any special requirements and can be done with a common pH meter.

Typically, the diethylene triammonium hexahalogenorhodate originates from the precious metals refining known to a person skilled in the art or, to be more precise, from the rhodium separation step in the scope of precious metals refining. Due to its poor solubility in water and/or hydrohalic aqueous milieu, the diethylene triammonium hexahalogenorhodate can be isolated therein in the rhodium separation step.

A preferred example is the above-mentioned diethylene triammonium hexahalogenorhodate.

The procedure applied in this context can be such that the diethylene triammonium hexahalogenorhodate is suspended in water and hydrohalic acid is added until the pH value of the aqueous suspension is adjusted to within the range of −1 to +2. Alternatively, the diethylene triammonium hexahalogenorhodate can just as well be added to and suspended in a hydrohalic acid having a pH in the range of −1 to +2.

The fraction of the diethylene triammonium hexahalogenorhodate in the aqueous suspension provided in step (1) is, for example, in the range of 5 to 40% by weight, expediently 10 to 30% by weight, relative to the total suspension.

In step (2) of the method according to the invention, a sufficient quantity of reducing agent for complete conversion of the diethylene triammonium hexahalogenorhodate is added to the suspension provided in step (1) and the reaction is allowed to proceed until the formation of elemental rhodium is completed. The term, "suspension", shall be understood to mean that the diethylene triammonium hexahalogenorhodate is present in suspension due to its poor solubility, i.e. the aqueous suspension therefore being agitated, for example being stirred.

It is feasible to use one or multiple reducing agent(s) in combination. In the latter case, the reducing agents can be added separately, i.e. one after the other, or at the same time or overlapping in time.

Various oxidisable substances such as, for example, hydrazine, hydrazine hydrate, Sn(II) compounds, such as $SnCl_2$, non-precious metals, such as zinc, iron, aluminium, tin, are suitable reducing agents.

It is preferred to use iron as reducing agent, particularly in the form of iron powder.

The addition of the reducing agent can be based on exact stoichiometric considerations or an excess as compared to theory, possibly needed for practical reasons, can be added, if applicable. It is preferred to add aliquots of the reducing agent or reducing agents to the agitated, for example stirred, suspension and to monitor the progress of the reaction by means of a disappearance and/or dissolution of the diethylene triammonium hexahalogenorhodate and the concurrent formation of elemental rhodium. The progress of the reaction can also be monitored analytically, for example supplementary to visual monitoring, for example by determination of the $Rh^{3+}$ content in the aqueous phase of the reaction material or by measuring the redox potential of the aqueous phase of the reaction material. In this regard, a person skilled in the art will understand the term, "sufficient amount of reducing agent", not in a purely stoichiometric sense, but based on the existing practical situation.

It is being assumed that the reduction reaction that is ongoing in step (2) can be described as follows using diethylene triammonium hexahalogenorhodate and iron as reducing agent for exemplary purposes:

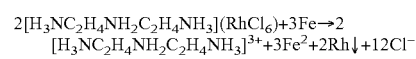

Possibly, hydrogen formed from the iron in the hydrohalic milieu of the reaction material may act as reducing agent as well; but this was not investigated in any more detail.

During step (2), the pH value of the aqueous phase of the reaction material is maintained in the range of −1 to +2, preferably of −0.5 to +0.5, for which purpose it may be necessary to add an appropriate amount of hydrohalic acid. The temperature of the reaction material during step (2) is, for example, in the range of 20 to 70° C., preferably 40 to 65° C. The duration of process step (2) is, for example, in the range of 2 to 4 hours, whereby it may be expedient to keep stirring after the final addition of reducing agent until the pH value is constant within the pH range of −1 to +2, preferably −0.5 to +0.5, for example for 0.5 to 2 hours at 20 to 70° C., preferably 40 to 65° C.

The elemental rhodium formed in step (2) is present in particulate form, in particular as spongy rhodium.

After the completion of step (2), the elemental rhodium formed in step (3) is separated from the hydrohalic aqueous composition formed in step (2). Conventional solid-liquid separation procedures known to a person skilled in the art can be used in this context, for example decanting, lifting, filtration or suitable combinations of said separation procedures.

The separated elemental rhodium can expediently be washed with water. Subsequently, the rhodium, which is obtained largely or completely free of accompanying organic substances in the method according to the invention, can be purified further. For example, a treatment with chlorine and hydrochloric acid while forming an aqueous acidic $H_3RhCl_6$ solution is feasible, which can then be purified further. Examples of suitable cleaning techniques include ion exchange, extraction, and electrolysis.

Ultimately, the substance, $H_3RhCl_6$, is the same result as is obtained in the above-mentioned method of aqua regio boiling of a salt of aliphatic polyamine and trihydrogen-hexachlororhodic acid.

The hydrohalic filtrate, which is obtained during the separation of elemental rhodium from the hydrohalic aqueous composition formed in step (2) and contains cations in the form of fully protonated diethylene triamine and halide anions, can also contain oxidised reducing agent and/or oxidation products thereof depending on the type of reducing agent used in step (2). If needed, said oxidised reducing agent or oxidation products of the reducing agent(s) can be removed from the filtrate, for example, through a suitable precipitation reaction; but there is no compelling necessity to do so. The hydrohalic filtrate can be used and/or reused in the scope of a further process step (4) of precious metals refining to precipitate $Rh^{3+}$ as diethylene triammonium hexahalogenorhodate.

One advantage of the method according to the invention is that it does not involve the above-mentioned boiling of the salts of aliphatic polyamine and trihydrogen hexahalogenorhodic acid in aqua regia. Accordingly, the production and ensuing need to remove nitrous gases is avoided as well. As mentioned above, another advantage is that the aliphatic polyamide is re-obtained in solution in hydrohalic acid-protonated aqueous form and can be reused in precious metals refining for precipitation of $Rh^{3+}$ as poorly soluble diethylene triammonium hexahalogenorhodate.

EXAMPLES

Example 1

A total of 30 g solid diethylene triammonium hexachlororhodate were suspended in 150 ml of water, the suspension was heated to 60° C., and 10N hydrochloric acid was added to adjust the pH to 0.5. Then, 10 g iron powder was added in aliquots to the suspension while stirring and the sample was maintained at 60° C. The pH was checked during the addition of iron and maintained at pH 0 to −0.5 by adding 10N hydrochloric acid. Stirring at 60° C. was continued for 2 more hours. The reaction material was separated by suction filtration into elemental rhodium, in the form of spongy rhodium, and an acidic aqueous filtrate containing dissolved diethylene triammoniumchloride. The spongy rhodium was washed with water and then subjected to further refining by means of chlorine and hydrochloric acid; the rhodium yield relative to the rhodium content of the diethylene triammonium hexachlororhodate educt was: >99%.

Example 2

A total of 30 g solid diethylene triammonium hexachlororhodate were suspended in 200 ml of water, the suspension was heated to 60° C., and 10N hydrochloric acid was added to adjust the pH to 0.2. Then, 10 g iron powder was added in aliquots to the suspension while stirring and the sample was maintained at 60° C.

The pH was checked during the addition of iron and maintained at pH 0 to −0.5 by adding 10N hydrochloric acid. Stirring was continued for 2 more hours. The reaction material was separated by suction filtration into elemental rhodium, in the form of spongy rhodium, and an acidic aqueous filtrate containing dissolved diethylene triammoniumchloride. The spongy rhodium was washed with water and then subjected to further refining by means of chlorine and hydrochloric acid; the rhodium yield relative to the rhodium content of the diethylene triammonium hexachlororhodate educt was: >99%.

The invention claimed is:

1. A method for producing elemental rhodium, comprising the steps of:
   (1) providing an aqueous suspension of diethylene triammonium hexahalogenorhodate adjusted with a hydrohalic acid to a pH value of −1 to +2;
   (2) adding a sufficient quantity of at least one reducing agent to the suspension provided in step (1) to form a hydrohalic aqueous composition and elemental rhodium; and
   (3) separating the elemental rhodium formed in step (2) from the hydrohalic aqueous composition formed in step (2);
   wherein the halogen of the diethylene triammonium hexahalogenorhodate is bromine and/or chlorine.

2. The method of claim 1,
   wherein the pH value of the aqueous suspension provided in step (1) is in the range of −0.5 to +0.5.

3. The method of claim 1,
   wherein the diethylene triammonium hexahalogenorhodate originates from a rhodium separation step of a precious metals refining process.

4. The method of claim 1,
   wherein the diethylene triammonium hexahalogenorhodate is suspended in water and the hydrohalic acid is added until the pH value of the aqueous suspension is adjusted to within the range of −1 to +2.

5. The method of claim 1,
   wherein the aqueous suspension has 5 to 40% by weight of diethylene triammonium hexahalogenorhodate.

6. The method of claim 1,
   wherein the aqueous suspension is agitated during step (2).

7. The method of claim 1,
   wherein the at least one reducing agent is a combination of reducing agents, and wherein the combination of reducing agents are used one after the other, at the same time or overlapping in time.

8. The method of claim 1,
   wherein the at least one reducing agent is selected from the group consisting of hydrazine hydrazine hydrate, Sn(II) compounds, zinc, iron, aluminium, and tin.

9. The method of claim 1,
wherein iron powder is used as the reducing agent.
10. The method of claim 1,
wherein the pH value is maintained in the range of −1 to +2 during step (2).
11. The method of claim 1,
wherein the temperature of the reaction material is maintained in the range of 20 to 70° C. during step (2).
12. The method of claim 1,
wherein a hydrohalic filtrate is obtained during the separation of the elemental rhodium from the hydrohalic aqueous composition, and wherein the hydrohalic filtrate is used in a step (4) to precipitate $Rh^{3+}$ as diethylene triammonium hexahalogenorhodate.
13. The method of claim 12,
the at least one reducing agent or an oxidation product of the at least one reducing agent is removed from the hydrohalic filtrate before using it in step (4).

14. The method of claim 1,
wherein the diethylene triammonium hexahalogenorhodate is diethylene triammonium hexachlororhodate.
15. The method of claim 1,
wherein the diethylene triammonium hexahalogenorhodate is added to and suspended in the hydrohalic acid, the hydrohalic acid having a pH in the range of −1 to +2.
16. The method of claim 1,
wherein the hydrohalic acid is hydrobromic acid, hydrochloric acid, or a combination thereof.
17. The method of claim 1,
wherein the pH value is maintained in the range of −1 to +2 during step (2) by adding a hydrohalic acid.
18. The method of claim 17,
wherein the hydrohalic acid is hydrobromic acid, hydrochloric acid, or a combination thereof.

* * * * *